(12) United States Patent
Ohno (10) Patent No.: US 6,944,207 B2
(45) Date of Patent: Sep. 13, 2005

(54) CDMA RECEIVER HAVING A SEARCHER INTERMITTENTLY OPERABLE

(75) Inventor: Katsumaru Ohno, Tokyo (JP)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 09/769,407

(22) Filed: Jan. 26, 2001

(65) Prior Publication Data

US 2001/0009562 A1 Jul. 26, 2001

(30) Foreign Application Priority Data

Jan. 26, 2000 (JP) .......................................... 2000-017679

(51) Int. Cl.[7] .......................... H04B 15/00; H04K 1/00; H04L 27/30
(52) U.S. Cl. ........................ 375/148; 375/144; 375/349
(58) Field of Search ................................ 375/140–144, 375/147, 148, 150, 152, 349; 370/335, 342, 441, 479

(56) References Cited

U.S. PATENT DOCUMENTS

| | | | | |
|---|---|---|---|---|
| 5,867,527 A | * | 2/1999 | Ziv et al. ..................... | 375/147 |
| 6,044,104 A | * | 3/2000 | Watanabe ................... | 375/142 |
| 6,072,807 A | * | 6/2000 | Daudelin ..................... | 370/465 |
| 6,373,882 B1 | * | 4/2002 | Atarius et al. .............. | 375/148 |
| 6,580,749 B1 | * | 6/2003 | Miura ......................... | 375/147 |
| 6,600,907 B1 | * | 7/2003 | Taguchi ...................... | 455/132 |
| 6,704,577 B1 | * | 3/2004 | Hughes ....................... | 455/515 |
| 6,711,384 B2 | * | 3/2004 | Kubo et al. .................. | 455/68 |
| 6,731,622 B1 | * | 5/2004 | Frank et al. ................. | 370/342 |

FOREIGN PATENT DOCUMENTS

| | | |
|---|---|---|
| JP | 7-95126 | 4/1995 |
| JP | 10-200507 | 7/1998 |
| JP | 10-209953 A | 8/1998 |
| JP | 11-98071 A | 4/1999 |
| JP | 11-177524 | 7/1999 |
| JP | 11-186987 | 7/1999 |
| JP | 11-274978 A | 10/1999 |
| JP | 2000-22665 A | 1/2000 |

* cited by examiner

Primary Examiner—Phuong Phu
(74) Attorney, Agent, or Firm—Sughrue Mion, PLLC (57) ABSTRACT

In a CDMA receiver comprising a searcher for preparing a delay profile to produce path information identifying main propagation paths, a path monitor monitors the path information from the searcher to produce a detection signal when the main propagation paths are stable for a predetermined time interval. Responsive to the detection signal, a searcher operation controller controls the searcher to make the searcher intermittently operate at a predetermined intermittent period. The path monitor includes a path information memory for storing current path information from the searcher as stored path information and a path comparator for comparing the stored path information with the current path information. The path comparator produces a path coincidence signal when the stored path information coincides with the current path information. The path comparator produces a path inconsistency signal when the stored path information coincides with the current path information. Responsive to the path coincidence signal, a path coincidence counter counts a path coincidence count. Responsive to the path inconsistency signal, the path coincidence counter initializes the path coincidence count to an initial count The path monitor produces the detection signal when the path coincidence count reaches a predetermined count.

11 Claims, 7 Drawing Sheets

CDMA RECEIVER HAVING A SEARCHER INTERMITTENTLY OPERABLE

BACKGROUND OF THE INVENTION

This invention relates to a code division multiple access (CDMA) receiver for use in a CDMA system and a method of controlling the CDMA receiver.

As a cellular mobile radio communication system, a wide variety of multiple access systems have been heretofore proposed and be adopted in the world. Among others, a recent tendency has been directed to a cellular mobile radio code division multiple access (CDMA) system which has a specific spreading code assigned to each channel and which will be simply called a CDMA system. In such a CDMA system, a modulated wave of an identical carrier frequency which is spread by each specific spreading code is transmitted as a radio signal from a transmitter side to a receiver side. Responsive to the radio signal, a CDMA receiver in the receiver side carries out synchronization operation by the use of each specific spreading code to identify a desired channel. In order to distinguish the channels from one another, different spreading codes are used to identify radio channels between the base station and the mobile stations.

In addition, it is to be noted that the radio signal is received, as received CDMA signals, through a plurality of radio propagation paths, namely, a multipath in the CDMA system and, therefore, multipath fading should be removed from the radio signal in the CDMA receiver by accurately detecting a predetermined signal, such as a synchronization signal and/or a pilot signal. The received CDMA signal is a baseband signal.

Furthermore, it is to be considered in the cellular mobile radio communication system that each mobile station is moved through the radio service areas or cells from one to another with communication kept between each mobile station and a base station. In this event, the base stations must be switched from one to another without interrupting communication with each mobile station.

Taking the above into account, a CDMA receiver which is used in a mobile station has a rake receiver supplied with received CDMA signals through the multipath and a searcher for searching such multipath signals to establish chip synchronization. The rake receiver and the searcher constitute a baseband processing portion. In other words, the searcher is used to detect optimum reception timing from the CDMA received signals and to inform the rake receiver of the optimum reception timing. That is, the searcher calculates a delay profile in the received CDMA signals to produce path information corresponding to a main propagation path. This applies to the CDMA receiver which is used in each base station.

Practically, both the rake receiver and the searcher are given received CDMA signals which are subjected to high frequency amplification and frequency conversion by a high frequency amplifier and an intermediate amplifier, respectively. In this event, the rake receiver is operable in response to the received CDMA signals received through the multipath and comprises a plurality of finger receivers for demodulating the received CDMA signal by the use of a spreading code into a demodulated signal. To this end, calculations are made about correlations between a spreading code of a desired channel and each received multipath signal to capture codes at each reception timing through each path. Thereafter, maximal-ratio combining or rake combining is carried out to augment received signal strength. Such maximal-ratio combining or rake combining is effective to alleviate an influence of the multipath fading and to improve a signal-to-noise (S/N) ratio.

On the other hand, the searcher has a plurality of correlators which are operable in response to the received CDMA signals and delayed spreading codes to calculate correlation values between the received CDMA signals and the delayed spreading codes and a plurality of adders for adding the respective correlation values to produce summed up correlation values. Moreover, the summed up correlation values are delivered to an effective path judgment circuit to determine an effective path and to supply the finger circuits of the rake receiver with reception timing signals representative of the effective path or optimum reception timing.

Herein, it is to be noted that the correlators of the searcher are in one-to-one correspondence to the adders.

In a wide-band CDMA (W-CDMA) communications apparatus or receiver, a baseband signal has a signal rate which is higher than that of a narrow-band CDMA communications apparatus or receiver. In addition, the W-CDMA receiver has a baseband processing portion which consumes an increased power. As a result, there are circumstances which cannot despise a method of decreasing a consumed power. Furthermore, in a CDMA communications apparatus operable in a battery such as a portable terminal, it is properly desirable to decrease a consumed power in the apparatus without distinction of the wide-band and the narrow-band.

In order to meet such a demand, Japanese Unexamined Patent Publication of Tokkai No. Hei 11-186,987 or JP-A 11-186987 discloses "PHASE TRACKING DEVICE FOR CDMA RECEIVER" to relieve the processing load of an integration means by varying an integration time depending on the reception environment, in phase tracking to maintain synchronization of a CDMA (code division multiple access) receiver. According to JP-A 11-186987, a despreading means despreads a pilot signal in a received signal to produce a despread pilot signal. A strength measurement means measures a received pilot signal strength from the despread pilot signal. Based on the received pilot signal strength, an integration control means determines an integration time interval in an integration means. The integration means sums, for the integration time interval, the strength difference detected by a strength difference detection means. Inasmuch as the integration time interval in the integration means is varied in response to the reception environment, the processing load of the integration means is relieved when the reception environment. It is therefore possible to realize a superior phase tracking device with less power consumption for a CDMA receiver.

In addition, various other prior arts related to the present invention are already known. By way of example, Japanese Unexamined Patent Publication of Tokkai No. Hei 11-177, 524 or JP-A 11-177524 discloses "MOBILE TERMINAL EQUIPMENT" to extend the service time by reducing power of the mobile communication terminal equipment in an intermittent reception. According to JP-A 11-177524, the mobile communication terminal equipment adopting the CDMA system is provided with a pilot PN synchronization detection section including a SAW matched filter that carries out partial correlation arithmetic with a pilot PN code at an intermediate frequency band. The pilot PN synchronization detection section produces an initializing pulse in matching with production of a correlation peak for a pause period at intermittent reception. A PN timing generating circuit is initialized by the initializing pulse to maintain pilot PN synchronization. As a result, power supply of a baseband front-end section is interrupted, the operation of a rake engine section is stopped to reduce the current consumption for a pause period.

Japanese Unexamined Patent Publication of Tokkai No. Hei 10-200,507 or JP-A 10-200507 discloses "RECEIVER, RECEIVING METHOD AND TERMINAL IN RADIO SYSTEM" to shorten the operation time of a controller at the time of intermittent reception and to reduce power consumption by setting control information of the next receiving state during the operation of a controlling part before, reaching a sleep state and performing intermittent reception so that the operation of the controlling part may be stopped until data processing is needed. According to JP-A 10-200507, a searcher is activated at the time of intermittent reception, and after searching processing of the searcher is finished, an operation of a controller is started. After the searcher captures each path, a phase that is captured by the searcher is set to a plurality of fingers, and the operations of the fingers are started. The controller does not operate at the time of search in this way, and after the search has been finished, the operation time of the controller is started. Then, the operation time of the controller spans from when the search of the searcher is finished to when a demodulation operation at the fingers is completed, the operation time is shortened and power consumption is reduced.

Japanese Unexamined Patent Publication of Tokkai No. Hei 7-95,126 or JP-A 7-095126 discloses "RECEIVER" to reduce power consumption by stopping the operation of a TTL circuit for undesired control. According to JP-A 7-095126, 1 upon the receipt of a decision bit whose level is logical "1", a searcher stops the operation of first through third TTL (Time Tracking Loop) circuits provided respectively to first through third despreading devices except for the first TTL circuit. And the phase of a PN series generated by a PN generating circuit controlled by the TTL circuit whose operation is stopped is controlled so as to be coincident with a position shifted in the unit of delay time between paths constituting a multi-path based on the phase of the PN series controlled by the first TTL circuit in operation.

However, in the above-mentioned Publications, power reduction of the searcher is not considered. Inasmuch as the searcher detects the paths at a high speed, the searcher has a large scale in circuitry and has a large power consumption. As a result, it is desired to reduce power consumption in the searcher.

SUMMARY OF THE INVENTION

It is an object of this invention to provide a CDMA receiver which is capable of reducing power consumption in a searcher.

It is another object of this invention to provide a power consumption reducing method which is capable of reducing power consumption in a searcher.

According to an aspect of this invention, a CDMA receiver comprises a searcher for preparing a delay profile in received CDMA signals that indicates a plurality of radio propagation paths to produce path information identifying main propagation paths. The CDMA receiver comprises path monitoring means for monitoring the path information from the searcher to produce a detection signal when the main propagation paths are stable for a predetermined time interval and searcher operation controlling means for controlling, in response to the detection signal, the searcher to make the searcher intermittently operate at a predetermined intermittent period.

In this event, the path monitoring means may include path information memory means for storing current path information from the searcher as stored path information and path comparing means for comparing the stored path information with the current path information. The path comparing means produces a path coincidence signal when the stored path information coincides with the current path information. The path comparing means produces a path inconsistency signal when the stored path information coincides with the current path information. Responsive to the path coincidence signal, path coincidence counting means counts a path coincidence count. Responsive to the path inconsistency signal, the path coincidence counting means initializes the path coincidence count to an initial count. The monitoring means produces the detection signal when the path coincidence count reaches a predetermined count. The initial count may be equal to one. When the CDMA receiver comprises power supplying means for supplying the CDMA receiver with electric power, the CDMA receiver further may comprise monitor mode switching means for switching an operating mode of the path monitoring means in response to power supply capacity of the power supplying means.

According to another aspect of this invention, a method is reducing power consumption in a CDMA receiver comprising a searcher for preparing a delay profile in received CDMA signals that indicates a plurality of radio propagation paths to produce path information identifying main propagation paths. The method comprises the steps of monitoring the path information from the searcher to produce a detection signal when the main propagation paths are stable for a predetermined time interval and of controlling, in response to the detection signal, the searcher to make the searcher intermittently operate at a predetermined intermittent period.

According to still another aspect of this invention, a CDMA receiver comprises a searcher for preparing a delay profile in received CDMA signals that indicates a plurality of radio propagation paths to produce path information identifying main propagation paths. The CDMA receiver comprises means for making the searcher intermittently operate in response to power supply capacity of power supplying means.

According to yet another aspect of this invention, a method is for reducing power consumption in a CDMA receiver comprising a searcher for preparing a delay profile in received CDMA signals that indicates a plurality of radio propagation paths to produce path information identifying main propagation paths. The method comprises the step of making the searcher intermittently operate in response to power supply capacity of power supplying means.

DESCRIPTION OF THE PREFERRED EMBODIMENTS

Description will first proceed to a summary of this invention. Attention will be directed to a CDMA (code division multiple access system) comprising a plurality of CDMA communications apparatuses each of which comprises a CDMA transmitter and a CDMA receiver. The CDMA transmitter transmits a radio signal such as speech, data, or the like. The CDMA receiver receives the radio signal as received CDMA signals. In such a CDMA system, the CDMA receiver receives the radio signal (the received CDMA signals) through a plurality of radio propagation paths, namely, a multipath caused by a reflected wave or a diffracted wave. For this purpose, the CDMA receiver comprises a receiving portion including a function for detecting the plurality of radio propagation paths or the multipath. Specifically, the multipath varies every moment in a mobile communication at urban communities. In the receiving portion, detection of the mulipath is carried out by a searcher at any time. In other words, the searcher carries out capture operation of the multipath.

According to this invention, the CDMA receiver detects whether or not the multipath is stable for a predetermined time interval and makes the searcher intermittent operation when the multipath is stable for the predetermined time interval. It is therefore possible to reduce power consumption in the searcher. In addition, the searcher may carry out intermittent operation on the basis of power supply capacity in a power supply portion. In this event, it is possible to reduce power consumption in the searcher. In a mobile communication, a condition where a user of a mobile terminal moves at a high speed is restricted. As a result, it is not necessarily to always operate the searcher and this invention has a large effect to reduce the power consumption.

Figure 1:
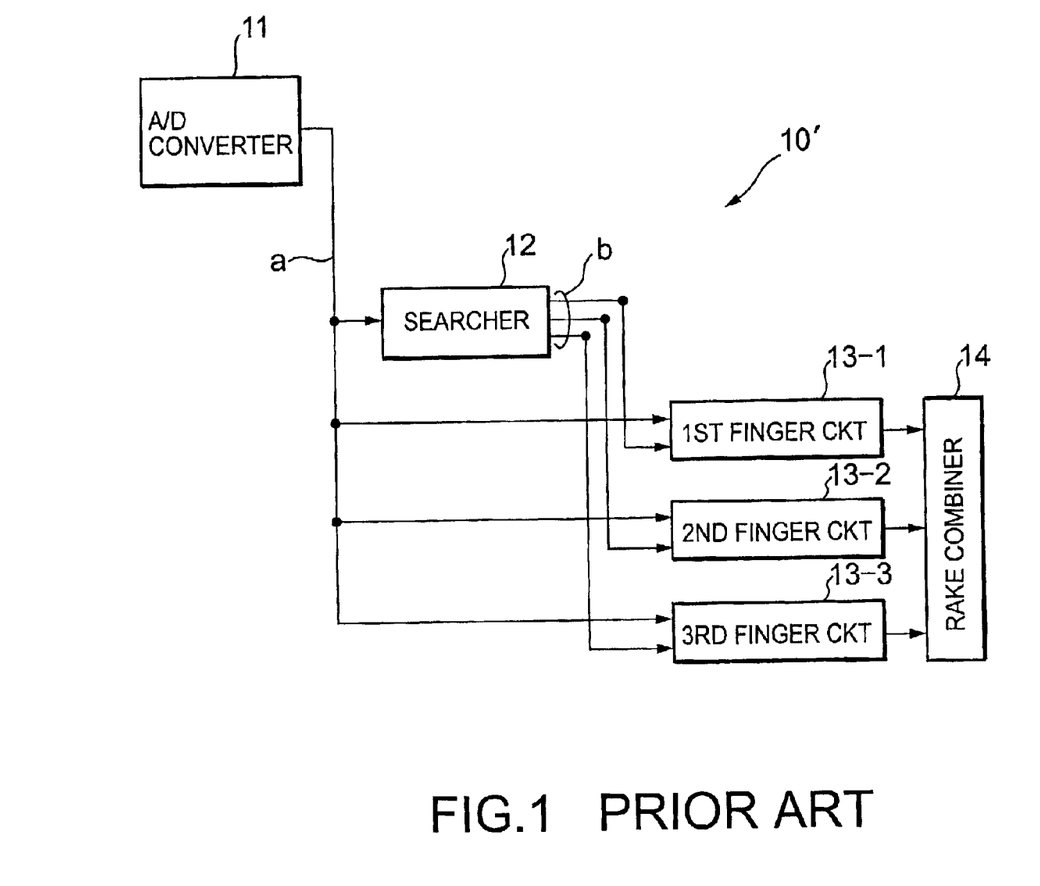
FIG. 1 shows a block diagram for use in describing a conventional CDMA receiver.

Referring to FIG. 1, a conventional receiver 10' will be described at first in order to facilitate an understanding of the present invention. It is assumed that the receiver 10' is used in each mobile station of a CDMA system. In this connection, the illustrated receiver 10' may be called a CDMA receiver or a mobile station receiver. Although not shown in FIG. 1, the mobile station has a high frequency amplifier portion for high frequency amplification and frequency conversion and an intermediate frequency (IF) amplifier portion for intermediate frequency amplification. At any rate, the illustrated CDMA receiver 10' is supplied with received data signals a through the high frequency amplifier portion and the intermediate frequency (IF) amplifier portion in the form of an analog baseband signal.

In the example being illustrated, the CDMA receiver 10 comprises an analog-to-digital (A/D) converter 11, a searcher 12, first through third finger circuits 13-1, 13-2, 13-3, and a rake combiner 14. Although the number of the finger circuits is three in the example being illustrated, the number of the finger circuits may not be restricted to three. The first through the third finger circuits 13-1 to 13-3 and the rake combiner 14 may be collectively called a rake receiver.

The A/D converter 11 is supplied with the analog baseband signal. The A/D converter 11 converts the analog baseband signal into a digital baseband signal a. The digital baseband signal a is supplied to the searcher 12 and the first through the third finger circuits 13-1 to 13-3.

The searcher 12 receives the digital baseband signal a and searches reception timings which are optimum for the first through the third finger circuits 13-1 to 13-3. As a result, the searcher 12 supplies the first through the third finger circuits 13-1 to 13-3 with the reception timing as detected reception timing signals b, as shown in FIG. 1. To this end, the illustrated searcher 12 calculates correlation values by successively shifting despreading timing of the digital basaband signal a in a manner known in the art to search the optimum reception timing in each of the finger circuits and to consequently detect chip synchronization.

The first through the N-th finger circuits 13-1 to 13-3 process despreading operation of the digital baseband signal a in response to the detected reception timing signals b and produce processed signals obtained by despreading the digital baseband signal a. The processed signals may be referred to as detected data signals detected from the digital signal a.

The processed signals which are despread by the first through the third finger circuits 13-1 to 13-3 are sent to the rake combiner 14 for summing up the processed signals by the use of the maximal-ratio combining technique. In other words, the rake combiner 14 carries out rake combining related to the processed signals sent from the first through the third finger circuits 13-1 to 13-3 and produces a rake combined signal which may be simply called a combined data signal also. The rake combined signal is delivered to a decoder (not shown) to be decoded into a decoded data signal.

Description will be made as regards operation of the searcher 12 and the first through the third finger circuits 13-1 to 13-3. The searcher 12 is supplied with the digital baseband signal a in the manner which is described above. Responsive to the digital baseband signal a, the searcher 12 searches optimum reception timings to produce the reception timing signals b which are supplied to the first through the third finger circuits 13-1 to 13-3.

The searcher 12 multiplies the digital baseband signal a by shifted spreading codes to prepare a delay profile indicative of correlation values on each delay time. The delay profile indicates a plurality of radio propagation paths in the received CDMA signals. In addition, the searcher 12 carries out threshold judgement of the radio propagation paths in the delay profile and notifies the finger circuits 13-1 to 13-3 of path information identifying main propagation paths which are judged to be in effective. The path information is the detected reception timing signals b or optimum reception timing signals.

Now, description will proceed to the path information b where the searcher 12 sends to the first through the third finger circuits 13-1 to 13-3. It will be assumed that there are, as the main propagation paths, three propagation paths which are judged or detected to be in effective when the searcher 12 carries out the threshold judgement of the radio propagation paths in the delay profile. In addition, it will be assumed that the detected three propagation paths are indicated by first through third path signals P1, P2, and P3. In this event, the detected three propagation paths are delivered to the respective finger circuits. That is, the first path signal P1 is delivered to the first finger circuit 13-1, the second path signal P2 is delivered to the second finger circuit 13-2, and the third path signal P3 is delivered to the third finger circuit 13-3.

In addition, it will be assumed that there are, as the main propagation paths, two propagation paths detected to be in effective and the detected two propagation paths are indicated by first and second path signals P1' and P2'. In this event, the first path signal P1' is delivered to the first finger circuit 13-1, the second path signal P2' is delivered to the second finger circuit 13-2, and no path signal is delivered to the third finger circuit 13-3.

On the basis of the notified path signals b, each of the first through the third finger circuits 13-1 to 13-3 generates a despreading code and carries out despreading operation by multiplying the digital baseband signal a by the despreading code to produce a despread signal as the processed signal. Responsive to no path signal, each finger circuit carries out no despreading operation. The rake combiner 14 carries out rake combining related to the despread signals sent from the thirst through the third finger circuits 13-1 to 13-3 and produces a demodulated signal as the rake combined signal.

Figure 2:
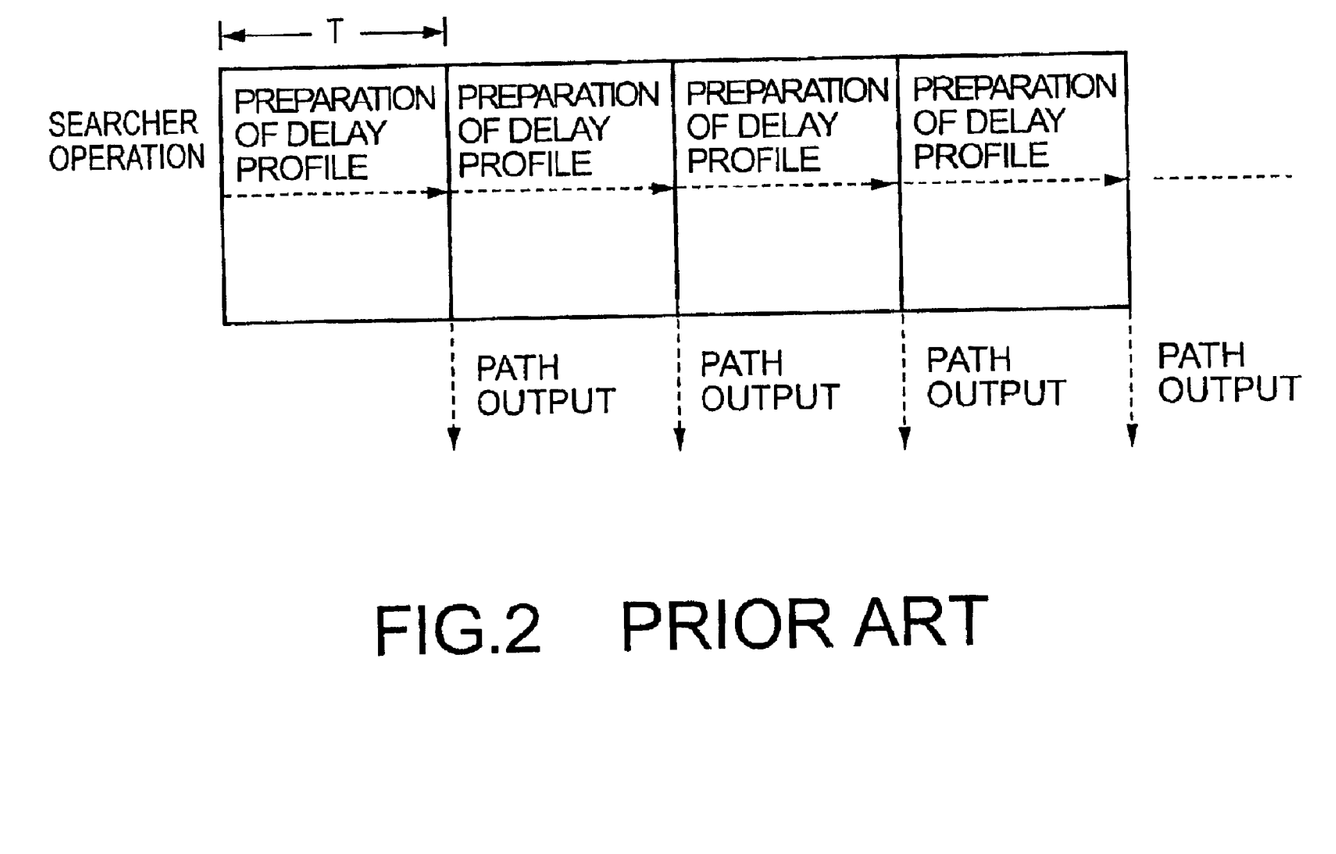
FIG. 2 shows a time chart for use in describing operation of a searcher in the conventional CDMA receiver illustrated in FIG. 1.

Referring to FIG. 2, description will be made about operation of the searcher 12 in the conventional CDMA receiver 10'. In FIG. 2, a symbol of T represents a time interval required from preparation of the delay profile to production of the path information b. In the conventional CDMA receiver 10', the searcher 12 always repeats operation of the preparation of the delay profile and the production of the path information b at a period of T.

Figure 3:
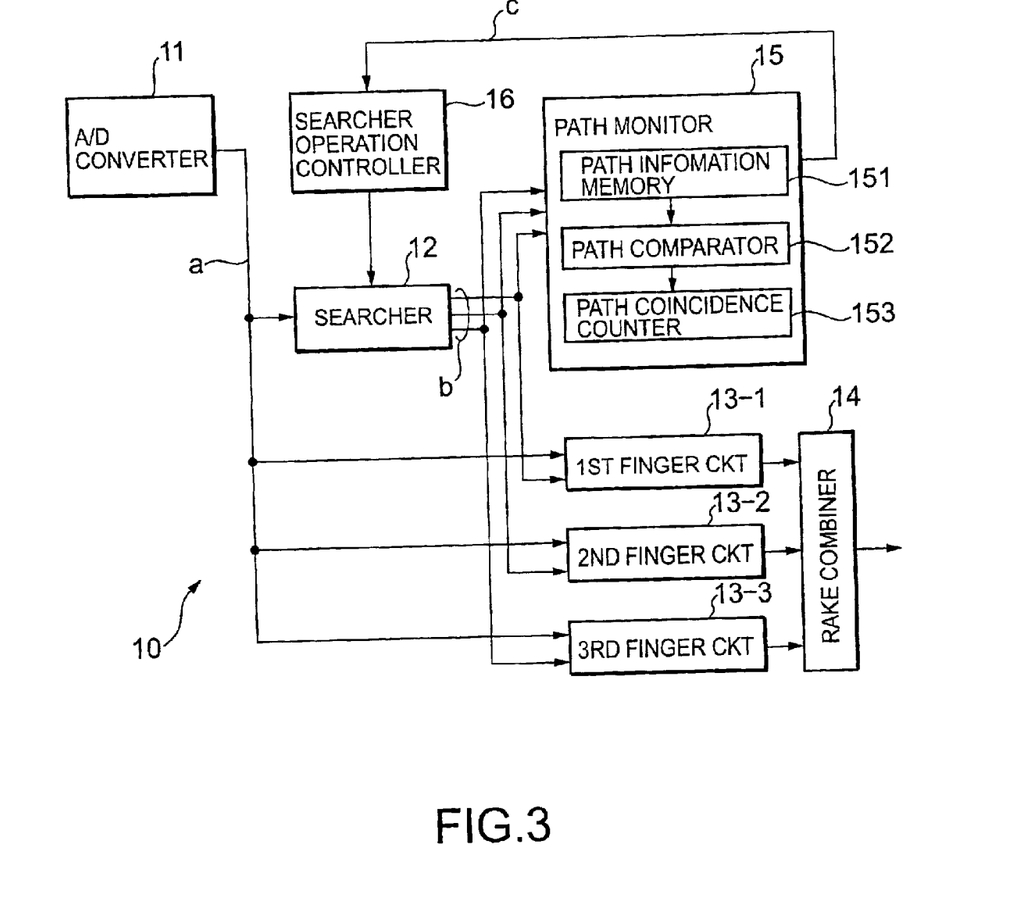
FIG. 3 shows a block diagram of a CDMA receiver according to a first embodiment of this invention.

Referring to FIG. 3, the description will proceed to a CDMA receiver 10 according to a first embodiment of this invention. The illustrated CDMA receiver 10 is similar in structure and operation to the conventional CDMA receiver 10' illustrated in FIG. 1 except that the CDMA receiver 10 further comprises a path monitor 15 and a searcher operation controller 16.

The path monitor 15 is connected to the searcher 12. The path monitor 15 is supplied with the path information b from the searcher 12. The path monitor 15 monitors the path information b. When the path monitor 15 detects that the path information b does not vary for a predetermined time interval or that the main propagation paths are stable for the predetermined time interval, the path monitor 15 produces a detection signal or an instruction signal c for instructing alteration of an operating period of the searcher 12.

The searcher operation controller 16 is connected to the path monitor 15 and the searcher 12. The searcher operation controller 16 is supplied with the detection signal or the instruction signal c from the path monitor 15. Responsive to the instruction signal c, the searcher operation controller 16 makes the searcher 12 intermittently operate for a predetermined intermittent period indicated by the instruction signal c.

The path monitor 15 includes a path information memory 151, a path comparator 152, and a path coincidence counter 153. The path information memory 151 is connected to the searcher 12. Supplied with current path information b for the first through the third finger circuits 13-1 to 13-3 from the searcher 12, the path information memory 151 stores the current path information as stored path information. The path comparator 152 is connected to the path information memory 151 and the searcher 12. The path comparator 152 is supplied with the current path information b and the stored path information from the searcher 12 and the path information memory 151, respectively. The path comparator 152 compares the stored path information with the current path information. When the stored path information coincides with the current path information, the path comparator 152 produces a path coincidence signal. When the stored path information does not coincide with the current path information, the path comparator 152 produces a path inconsistency signal. The path coincidence counter 153 is connected to the path comparator 152. Responsive to the path coincidence signal, the path coincidence counter 153 counts a path coincidence count. Responsive to the path inconsistency signal, the path coincidence counter 153 initializes the path coincidence count to an initial count of one.

Description will be made as regards operation of the CDMA receiver 10 illustrated in FIG. 3.

Supplied from the A/D converter 11, the digital baseband signal a is supplied to the searcher 12 and the first through the third finger circuits 13-1, 13-2, 13-3. The searcher 12 multiplies the digital baseband signal a by shifted spreading codes to prepare a delay profile indicative of correlation values on each delay time. The delay profile indicates a plurality of radio propagation paths in received CDMA signals. In addition, the searcher 12 carries out threshold judgement of the radio propagation paths in the delay profile and notifies the first through the third finger circuits 13-1 to 13-3 of path information b identifying main propagation paths which are judged to be in effective.

Now, description will proceed to the path information b where the searcher 12 sends to the first through the third finger circuits 13-1 to 13-3. It will be assumed that there are, as the main propagation paths, three propagation paths which are judged or detected to be in effective when the searcher 12 carries out the threshold judgement of the radio propagation paths in the delay profile. In addition, it will be assumed that the detected three propagation paths are indicated by first through third path signals P1, P2, and P3. In this event, the detected three propagation paths are delivered to the respective finger circuits. That is, the first path signal P1 is delivered to the first finger circuit 13-1, the second path signal P2 is delivered to the second finger circuit 13-2, and the third path signal P3 is delivered to the third finger circuit 13-3.

In addition, it will be assumed that there are, as the main propagation paths, two propagation paths which are detected to be in effective and the detected two propagation paths are indicated by first and second path signals P1' and P2'. In this event, the first path signal P1' is delivered to the first finger circuit 13-1, the second path signal P2' is delivered to the second finger circuit 13-2, and no path signal is delivered to the third finger circuit 13-3.

On the basis of the notified path signals b, each of the first through the third finger circuits 13-1 to 13-3 generates a despreading code and carries out despreading operation by multiplying the digital baseband signal a by the despreading code to produce a despread signal. Responsive to no path signal, each finger circuit carries out no despreading operation. The rake combiner 14 carries out rake combining related to the despread signals sent from the thirst through the third finger circuits 13-1 to 13-3 and produces a demodulated signal. The above-mentioned operation is similar to a conventional operation as mentioned before.

However, the CDMA receiver 10 further comprises the path monitor 15 and the searcher operation controller 16.

Figure 4:
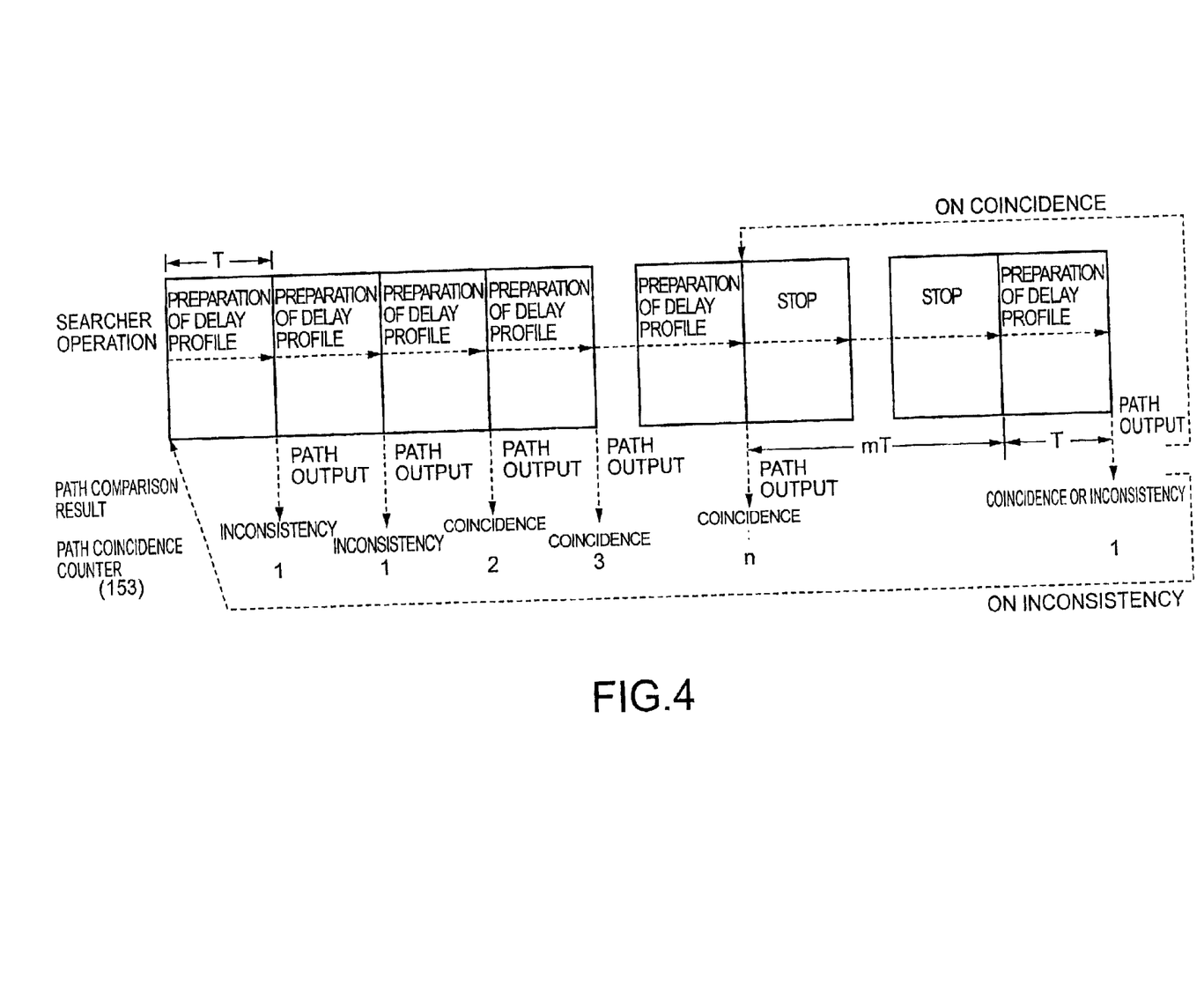
FIG. 4 shows a time chart for use in describing operation of a searcher in the CDMA receiver illustrated in FIG. 3.

Referring to FIG. 4 in addition to FIG. 3, description will be made about operation of the path monitor 15 and the searcher operation controller 16 in detail.

The path monitor 15 compares previous or stored path information with current path information supplied from the searcher 12. When the previous path information and the current path information coincide with each other for a predetermined count or the predetermined time interval, the path monitor 15 notifies the searcher operation controller 16 of the detection signal c indicative of the predetermined intermittent period of the searcher 12. With reference to the predetermined intermittent period indicated by the detection signal c, the searcher operation controller 16 turns operation of the searcher 12 on or off.

FIG. 4 exemplifies instruction in the path monitor 15 where search operation is stopped during a time interval of mT and subsequently is carried out during the period of T when coincidence of the path information is successively detected n times, where n and m represent first and second predetermined positive integers which are not less than two. In the example being illustrated, the first predetermined positive integer n is equal to the predetermined count. That is, the predetermined intermittent period is equal to a time interval of (m+1)T. The searcher 12 continues a periodic intermittent operation where the search operation is stopped during the time interval of mT and subsequently is carried out during the period of T until the path information b varies.

When the path monitor 15 detects that the path information b varies, the path monitor 15 instructs the searcher operation controller 16 that the searcher 12 always carries out path search operation. Supplied with an instruction of ordinary path search, the searcher operation controller 16 controls the searcher 12 so that the searcher 12 always carries out the path search operation to produce the path information b at the period of T. Such an operation where the searcher 12 always carries out the path search operation to produce the path information b at the period of T is continued until the path monitor 15 detects that the coincidence of the path information b is successively detected the predetermined count or n times.

Figure 5:
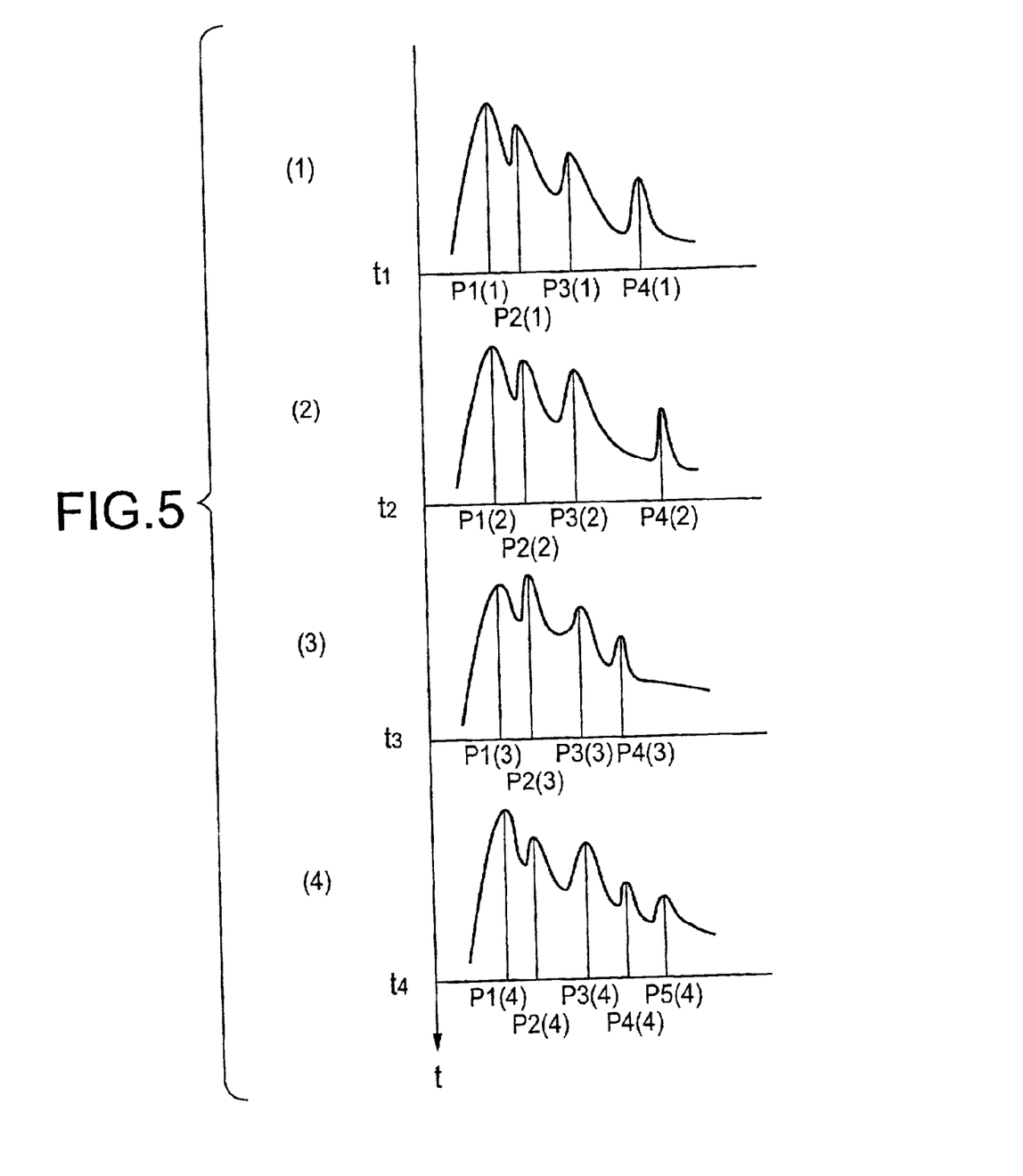
FIG. 5 is a view for use in describing a transition of delay profiles in a case where path information to be set in finger circuits does not vary.
Figure 6:
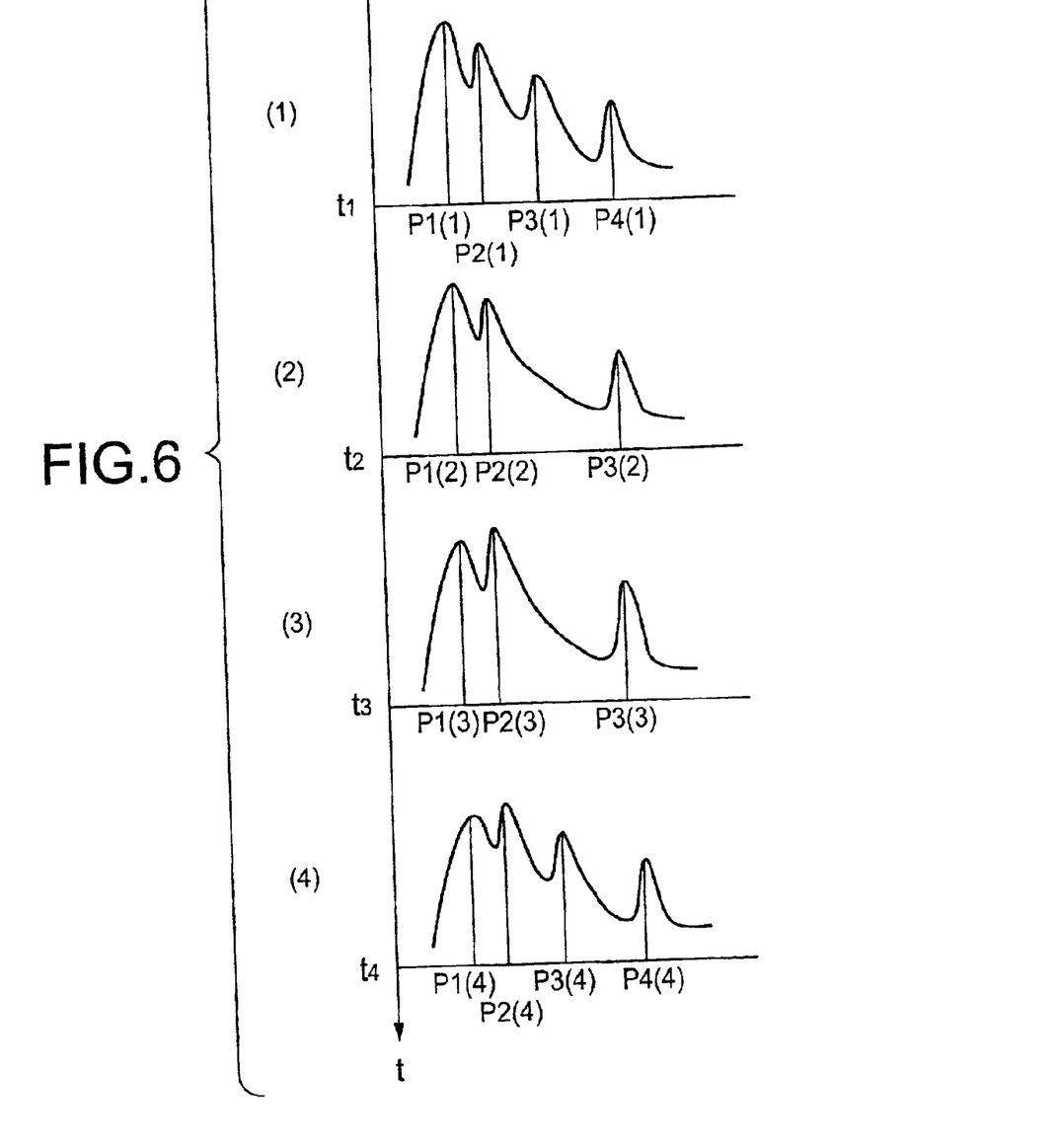
FIG. 6 is a view for use in describing another transition of delay profiles in another case where path information to be set in finger circuits varies.

Referring now to FIGS. 5 and 6, the description will be made as regards stability judgement processing of paths in detail. Each of FIGS. 5 and 6 illustrates a transition of delay profiles calculated by the searcher 12. FIG. 5 illustrates the transition of delay profiles in a case where the path information b to be set in the first through the third finger circuits 13-1 to 13-3 does not vary. FIG. 6 illustrates the transition of delay profiles in another case where the path information b to be set in the first through the third finger circuits 13-1 to 13-3 varies.

In each of FIGS. 5 and 6, an initial or first state (1) shows an initial or first delay profile calculated by the searcher 12 at an initial or first time instant t1, a second state (2) shows a second delay, profile calculated by the searcher 12 at a second time instant t2, a third state (3) shows a third delay profile calculated by the searcher 12 at a third time instant t3, and a fourth state (4) shows a fourth delay profile calculated by the searcher 12 at a fourth time instant t4.

Now, the description will proceed to operation of the case where the path information b does not vary with reference to FIG. 5.

The searcher 12 selects three paths in a prepared delay profile in order of magnitude of the correlation values and sets first through third path signals in the first through the third finger circuits 13-1 to 13-3 as reception timing signals for despreading. In the first delay profile illustrated in the first state (1) of FIG. 5, a first path signal P1(1) is set in the first finger circuit 13-1 as a reception timing signal for despreading, a second path signal P2(1) is set in the second finger circuit 13-2, and a third path signal P3(1) is set in the third finger circuit 13-3.

On the other hand, in the path monitor 15, the path information memory 151 temporality stores the first through the third path signals P1(1), P2(1), P3(1) as the stored path information. Inasmuch as the path monitor 15 is put into an initial state in this time instant, the path comparator 152 does not carry out path comparison operation.

At the second time instant t2, the searcher 12 selects three paths in order magnitude of correlation values in the second delay profile illustrated in the second state (2) of FIG. 5 and sets first through third path signals P1(2), P2(2), P3(2) in the first through the third finger circuits 13-1 to 13-3 as reception timings for despreading.

In the path monitor 15, the path comparator 152 compares the stored path information P1(1), P2(1), and P3(1) stored in the path information memory 151 with current path information P1(2), P2(2), and P3(2), respectively. In the example being illustrated, inasmuch as the stored path information P1(1), P2(1), and P3(1) coincides with the current path information P1(2), P2(2), and P3(2), the path comparator 152 produces the path coincidence signal. Response to the path coincidence signal, the path coincidence counter 153 counts up the path coincidence count to two. Inasmuch as the path information does not vary, the path information memory 151 does not renew the stored path information.

It will be assumed that the first predetermined positive integer n is equal to two. In this event, the searcher operation controller 16 controls the searcher 12 so as to intermittently operate. It will be assumed that the first predetermined positive integer n is equal to three or more. In this event, the searcher operation controller 16 controls the searcher 12 so as to normally operate.

At the third time instant t3, the searcher 12 selects three paths in order magnitude of correlation values in the third delay profile illustrated in the third state (3) of FIG. 5 and sets first through third path signals P1(3), P2(3), P3(3) in the first through the third finger circuits 13-1 to 13-3 as reception timings for despreading, respectively.

In the path monitor 15, the path comparator 152 compares the stored path information P1(1), P2(1), and P3(1) stored in the path information memory 151 with current path information P1(3), P2(3), and P3(3), respectively. In the example being illustrated, inasmuch as the stored path information P1(1), P2(1), and P3(1) coincides with the current path information P1(3), P2(3), and P3(3), the path comparator 152 produces the path coincidence signal. Response to the path coincidence signal, the path coincidence counter 153 counts up the path coincidence count to three. Inasmuch as the path information does not vary, the path information memory 151 does not renew the stored path information.

It will be assumed that the first predetermined positive integer n is equal to three. In this event, the searcher operation controller 16 controls the searcher 12 so as to intermittently operate. It will be assumed that the first predetermined positive integer n is equal to four or more. In this event, the searcher operation controller 16 controls the searcher 12 so as to normally operate.

Now, description will be made as regards handling in peak order of the correlation values.

In the second state (2) illustrated in FIG. 5, the first path signal P1(2) has a maximum peak in the correlation values. In the third state (3) illustrated in FIG. 5, the second path P2(3) has a maximum peak in the correlation values. That is, the maximum peak in the correlation values shifts from the first path signal P1 to the second path signal P2. However, inasmuch as path timing does not vary, the path comparator 152 judges that the path information signal P1(2), P2(2), P3(2) coincides with the path information signal P1(3), P2(3), P3(3). This is because the path information b, which is supplied from the searcher 12 to the path monitor 15, consists of timing information for paths and does not include calculated results of the correlation values or the like.

At the fourth time instant t4, the searcher 12 selects three paths in order magnitude of correlation values in the fourth delay profile illustrated in the fourth state (4) of FIG. 5 and sets first through third path signals P1(4), P2(4), P3(4) in the first through the third finger circuits 13-1 to 13-3 as reception timings for despreading, respectively.

In the path monitor 15, the path comparator 152 compares the stored path information P1(1), P2(1), and P3(1) stored in the path information memory 151 with current path information P1(4), P2(4), and P3(4), respectively. In the example being illustrated, inasmuch as the stored path information P1(1), P2(1), and P3(1) coincides with the current path information P1(4), P2(4), and P3(4), the path comparator 152 produces the path coincidence signal. Response to the path coincidence signal, the path coincidence counter 153 counts up the path coincidence count to four. Inasmuch as the path information b does not vary, the path information memory 151 does not renew the stored path information.

It will be assumed that the first predetermined positive integer n is equal to four. In this event, the searcher operation controller 16 controls the searcher 12 so as to intermittently operate. It will be assumed that the first predetermined positive integer n is equal to five or more. In this event, the searcher operation controller 16 controls the searcher 12 so as to normally operate.

Now, description will be made as regards handling of paths which are not used for despreading and rake combining.

In the third delay profile illustrated in the third state (3) of FIG. 5, a fourth path signal P4(3) indicates a fourth path having the fourth highest correlation value. Inasmuch as the CDMA receiver 10 comprises the first through the third finger circuits 13-1 to 13-3, the fourth path signal P4(3) is not used for despreading. Under the circumstances, in the path monitor 15, the path information indicative of paths having the fourth or more highest correlation values is not used for coincidence detection of the path information. Supplied from the searcher 12 to the path monitor 15, the path information b comprises the first through the third path signals P1, P2, P3 but does not include the fourth or more path signals P4, . . . , and so on. As a result, although fourth or more path timings coincide with one another between the third and the fourth delay profiles in the third and the fourth state (3) and (4) of FIG. 5, the path comparator 152 in the path monitor 15 judges that the path information coincides with each other between the third and the fourth delay profiles. This is because the first through the third path signals P1(3), P2(3), P3(3) in the third delay profile coincide with the first through the third path signals P1(4), P2(4), P3(4) in the fourth delay profile, respectively.

Now, the description will proceed to operation of the case where the path information b varies with reference to FIG. 6.

In the first delay profile illustrated in the first state (1) of FIG. 6, the searcher 12 sets, as reception timing signals for despreading, first through third path signals P1(1), P2(1), P3(1) in the first through the third finger circuits 13-1, 13-2, 13-3, respectively.

On the other hand, in the path monitor 15, the path information memory 151 temporality stores the first through the third path signals P1(1), P2(1), P3(1) as the stored path information. Inasmuch as the path monitor 15 is put into an initial state in this time instant, the path comparator 152 does not carry out path comparison operation. Inasmuch as a fourth path signal P4(1) indicates a fourth path having the fourth highest correlation value, the fourth path signal P4(1) is not treated in the path monitor 15 in the manner which is described above.

At the second time instant t2, the searcher 12 selects three paths in order magnitude of correlation values in the second delay profile illustrated in the second state (2) of FIG. 6 and sets, as reception timings for despreading, first through third path signals P1(2), P2(2), P3(2) in the first through the third finger circuits 13-1 to 13-3, respectively.

In the path monitor 15, the path comparator 152 compares the stored path information P1(1), P2(1), and P3(1) stored in the path information memory 151 with current path information P1(2), P2(2), and P3(2), respectively. In the example being illustrated, the third path signal P3(1) in the first delay profile disappears in the second delay profile illustrated in the second state (2) of FIG. 6. Accordingly, the path comparator 152 judges that the third path signal P3(1) in the first delay profile does not coincide the third path signal P3(2) in the second delay profile and then produces the path inconsistency signal. Response to the path inconsistency signal, the path coincidence counter 153 initializes the path coincidence count to the initial count of one. Inasmuch as the path information b varies, the path information memory 151 renews the stored path information to the first through the third path signals P1(2), P2(2), P3(2) in the second delay profile.

At the third time instant t3, the searcher 12 selects three paths in order magnitude of correlation values in the third delay profile illustrated in the third state (3) of FIG. 6 and sets, as reception timings for despreading, first through third path signals P1(3), P2(3), P3(3) in the first through the third finger circuits 13-1 to 13-3, respectively.

In the path monitor 15, the path comparator 152 compares the stored path information P1(2), P2(2), and P3(2) stored in the path information memory 151 with current path information P1(3), P2(3), and P3(3), respectively. In the example being illustrated, inasmuch as the stored path information P1(2), P2(2), and P3(2) coincides with the current path information P1(3), P2(3), and P3(3), the path comparator 152 produces the path coincidence signal. Response to the path coincidence signal, the path coincidence counter 153 counts up the path coincidence count to two. Inasmuch as the path information b does not vary, the path information memory 151 does not renew the stored path information.

It will be assumed that the first predetermined positive integer n is equal to two. In this event, the searcher operation controller 16 controls the searcher 12 so as to intermittently operate. It will be assumed that the first predetermined positive integer n is equal to three or more. In this event, the searcher operation controller 16 controls the searcher 12 so as to normally operate.

At the fourth time instant t4, the searcher 12 selects three paths in order magnitude of correlation values in the fourth delay profile illustrated in the fourth state (4) of FIG. 6 and sets, as reception timings for despreading, first through third path signals P1(4), P2(4), P3(4) in the first through the third finger circuits 13-1 to 13-3, respectively.

In the path monitor 15, the path comparator 152 compares the stored path information P1(2), P2(2), and P3(2) stored in the path information memory 151 with current path information P1(4), P2(4), and P3(4), respectively. In the example being illustrated, the third path signal P3(1) in the first delay profile revives as the third path signal P3(4) in the fourth delay profile illustrated in the fourth state (4) of FIG. 6. Accordingly, the path comparator 152 judges that the third path signal P3(3) in the third delay profile does not coincide the third path signal P3(4) in the fourth delay profile and then produces the path inconsistency signal. Response to the path inconsistency signal, the path coincidence counter 153 initializes the path coincidence count to the initial count of one. Inasmuch as the path information b varies, the path information memory 151 renews the stored path information to the first through the third path signals P1(4), P2(4), P3(4) in the fourth delay profile.

Figure 7:
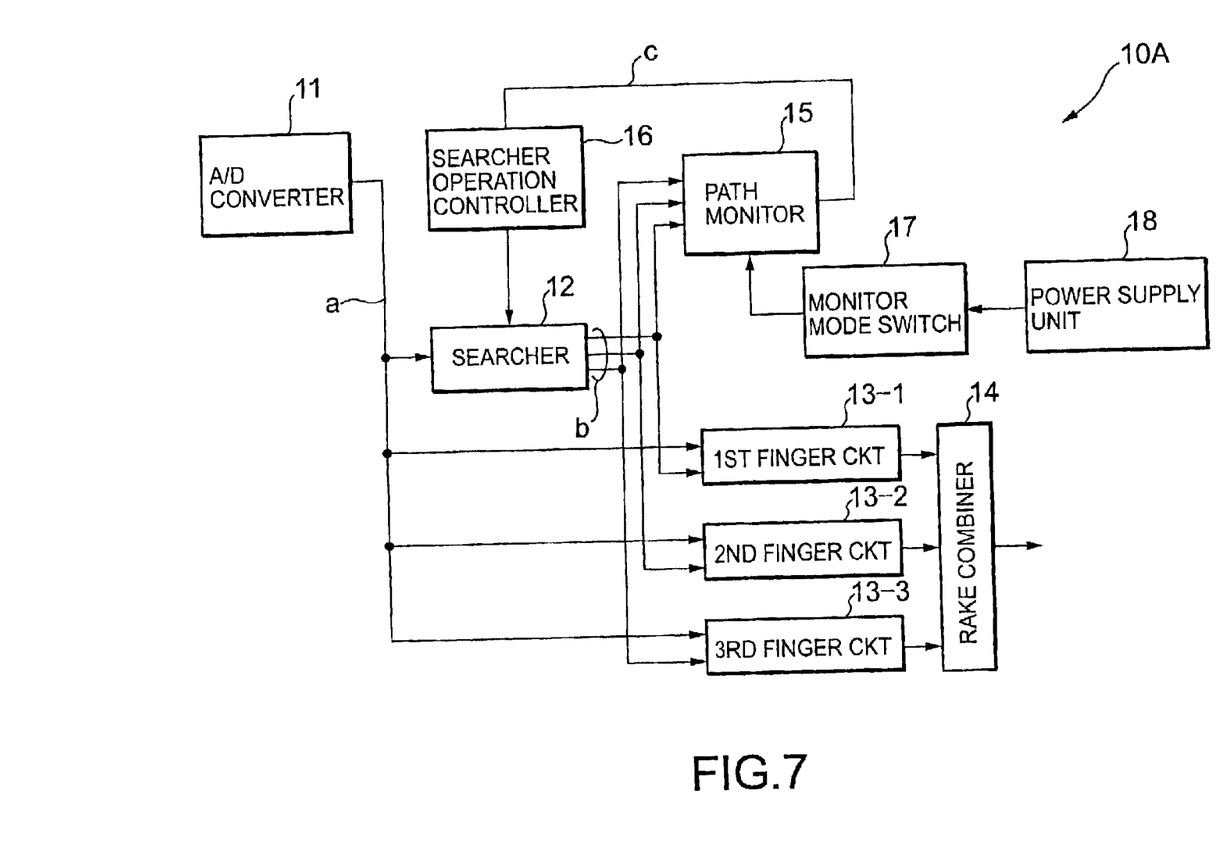
FIG. 7 shows a block diagram of a CDMA receiver according to a second embodiment of this invention.

Referring to FIG. 7, the description will proceed to a CDMA receiver 10A according to a second embodiment of this invention. The CDMA receiver 10A is similar in structure and operation to the CDMA receiver 10 illustrated in FIG. 3 except that the CDMA receiver 10A further comprises a monitor mode switch 17 in addition to a power supply unit 18.

The monitor mode switch 17 is connected to the path monitor 15 and is supplied with an input signal from the outside of the CDMA receiver 10. Responsive to the input signal, the monitor mode switch 17 switches an operating mode of the path monitor 15 in response to power supply capacity of the power supply unit 18 in the manner which will presently be described.

It will be assumed that the CDMA receiver 10 is a portable terminal which is activated by a battery unit. In this event, the CDMA receiver 10 comprises the power supply unit 18 which corresponds to the battery unit. The power supply unit 18 supplies the CDMA receiver 10 with electric power. When a battery remaining amount (the power supply capacity) is less than a predetermined amount, the power supply unit 18 sends, as the above-mentioned input signal, a power consumption reducing request to the monitor mode switch 17. Responsive to the power consumption reducing request, the monitor mode switch 17 sends a monitor stop instruction signal to the path monitor 15.

The path monitor 15 is operable in either a path monitor mode or a monitor stop mode. Responsive to the monitor stop instruction signal, the path monitor 15 is put into the monitor stop mode. In the monitor stop mode, the path monitor 15 stops a path monitoring operation and supplies the search operation controller 16 with a forcibly intermittent operation instruction signal for forcibly making the searcher 12 the periodic intermittent operation in the manner which is described in conjunction with FIG. 4. That is, the searcher 12 continues the periodic intermittent operation where the search operation is stopped during the time interval of mT and subsequently is carried out during the period of T.

It will be assumed that the power supply capacity in the power supply unit 18 returns to a normal state by a battery charging or the like. In this event, the power supply unit 18 sends, as the input signal, a normal power supply possible signal to the monitor mode switch 17. Responsive to the normal power supply possible signal, the monitor mode switch 17 sends a normal monitor operation instruction signal to the path monitor 15.

Responsive to the normal monitor operation instruction signal, the path monitor 15 is put into the path monitor mode. In the path monitor mode, the path monitor 15 carries out a normal monitoring operation in the similar manner which is described in conjunction with FIGS. 3 through 6.

With this structure, it is possible to automatically reduce power consumption when the power supply capacity in the CDMA receiver 10A deteriorates.

While this invention has thus far been described in conjunction with a few embodiments thereof, it will readily be possible for those skilled in the art to put this invention into practice in various other manners. For example, this invention may be applicable to a CDMA receiver which is used in a base station instead of the mobile station. Although the initial count of the path coincidence counter 153 is equal to one in the above-mentioned embodiments, the initial count may be equal to zero. In this event, the predetermined count is equal to a number (n−1) obtained by subtracting one from the first predetermined positive integer n.

What is claimed is:

1. A code division multiple access (CDMA) receiver comprising a searcher for preparing a delay profile in received CDMA signals that indicates a plurality of radio propagation paths to produce path information identifying main propagation paths, said CDMA receiver comprising:
 path monitoring means for monitoring the path information from said searcher to produce a detection signal when said main propagation paths are stable for a predetermined time interval; and
 searcher operation controlling means for controlling, in response to said detection signal, said searcher to make said searcher intermittently operate at a predetermined intermittent period,
 wherein said path monitoring means includes:
 path information memory means for storing current path information from said searcher as stored path information;
 path comparing means for comparing said stored path information with said current path information, said path comparing means producing a path coincidence signal when said stored path information coincides with the current path information; and
 path coincidence counting means for counting, in response to said path coincidence signal, a path coincidence count,
 said monitoring means producing said detection signal when said path coincidence count reaches a predetermined count.

2. A CDMA receiver as claimed in claim 1, wherein said path comparing means produces a path inconsistency signal when said stored path information coincides with the current path information and said path coincidence counting means initializes, in response to said path inconsistency signal, said path coincidence count to an initial count.

3. A CDMA receiver as claimed in claim 2, wherein said initial count is equal to one.

4. A method of reducing power consumption in a code division multiple access (CDMA) receiver comprising a searcher for preparing a delay profile in received CDMA signals that indicates a plurality of radio propagation paths to produce path information identifying main propagation paths, said method comprising the steps of:
 monitoring the path information from said searcher to produce a detection signal when said main propagation paths are stable for a predetermined time interval; and
 controlling, in response to said detection signal, said searcher to make said searcher intermittently operate at a predetermined intermittent period,
 wherein the monitoring step comprises the steps of:
 storing, in a path information memory, current path information from said searcher as stored path information;
 comparing said stored path information with said current path information to produce a path coincidence signal when said stored path information coincides with the current path information;
 counting, in response to said path coincidence signal, a path coincidence count, and
 producing said detection signal when said path coincidence count reaches a predetermined count.

5. A method as claimed in claim 4, wherein the comparing step produces a path inconsistency signal when said stored path information coincides with the current path information, and the counting step initializing, in response to said path inconsistency signal, said path coincidence count to an initial count.

6. A method as claimed in claim 5, wherein said initial count is equal to one.

7. The receiver as claimed in claim 1, wherein said main propagation paths are stable for a predetermined time interval when previously identified main propagation paths coincide with currently identified main propagation paths throughout said predetermined time interval.

8. The method as claimed in claim 4, wherein said main propagation paths are stable for a predetermined time interval when previously identified main propagation paths coincide with currently identified main propagation paths throughout said predetermined time interval.

9. A receiver, comprising:

a searcher;

a path monitoring means; and a searcher operation controlling means;

wherein said searcher periodically searches to identify main propagating paths, said path monitoring means generates a detection signal when said main propagation paths have not changed for a predetermined period of time, and said searcher operation controller means reduces the frequency of searches in accordance with said detection signal, and wherein current path information is compared with previously stored path information and a path coincidence signal is produced when said previously stored path information coincides with said current path information, said path monitoring means counts a number of coincidence signals produced and generates said detection signal when said count reaches a predetermined number.

10. A method of receiving a transmission signal, comprising:

periodically searching a received multipath signal;

identifying main propagation paths in said searched signal;

monitoring said identified main propagation paths; and reducing the frequency of said searching in accordance with a detection signal when said identified main propagation paths have not changed for a predetermined period of time, wherein said monitoring comprises:

storing current path information as stored path information;

comparing said stored path information with current path information and producing a path coincidence signal when said stored path information coincides with said current path information;

incrementing a path coincidence count in response to said produced path coincidence signals; and generating said detection signal when said path coincidence count reaches a predetermined number.

11. The method as claimed in claim 10, further comprising:

producing a path inconsistency signal when said stored path information does not coincide with said current path information; and initializing said path coincidence count to an initial number in response to said path inconsistency signal.

\* \* \* \* \*